T. COHN.
ICE CREAM MOLD.
APPLICATION FILED MAY 5, 1908.

909,550.

Patented Jan. 12, 1909.

2 SHEETS—SHEET 1.

Witnesses:

Inventor
Tobias Cohn
By His Attorney

T. COHN.
ICE CREAM MOLD.
APPLICATION FILED MAY 5, 1908.

909,550.

Patented Jan. 12, 1909.

2 SHEETS—SHEET 2.

Witnesses:

Inventor
Tobias Cohn
By His Attorney

UNITED STATES PATENT OFFICE.

TOBIAS COHN, OF NEW YORK, N. Y.

ICE-CREAM MOLD.

No. 909,550.        Specification of Letters Patent.        Patented Jan. 12, 1909.

Application filed May 5, 1908. Serial No. 430,916.

*To all whom it may concern:*

Be it known that I, TOBIAS COHN, a citizen of the United States, and a resident of the city, county, and State of New York, have invented a new and useful Improvement in Ice-Cream Molds, of which the following is a specification.

The object of my invention is to provide an article of this class which is particularly adapted for what is known as ice cream sandwiches and in which the sandwich may be formed and removed.

My invention simplifies and improves the structures of this kind.

Figure 1:
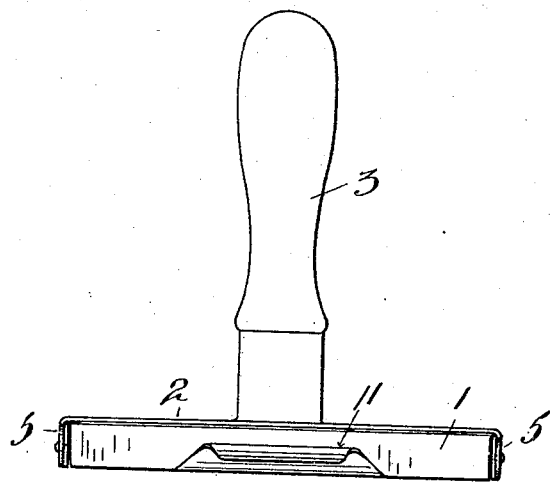
Figure 2:
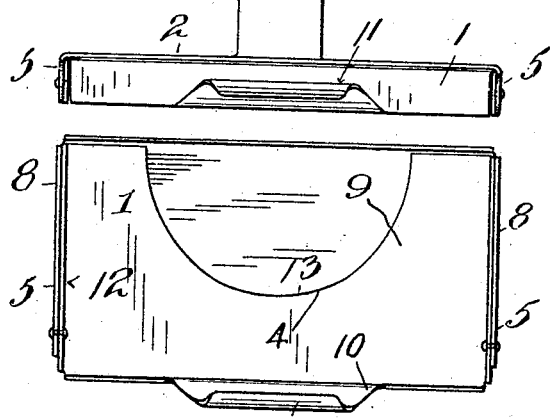
Figure 3:
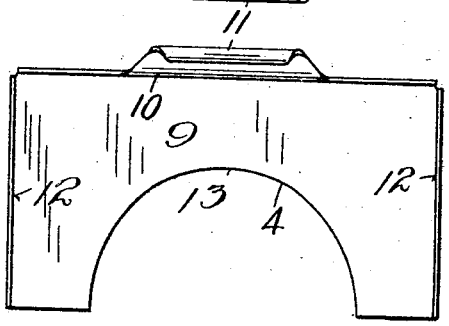
Figure 4:
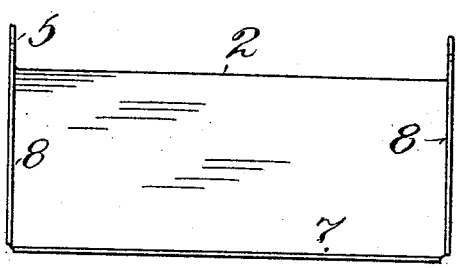
Figure 5:
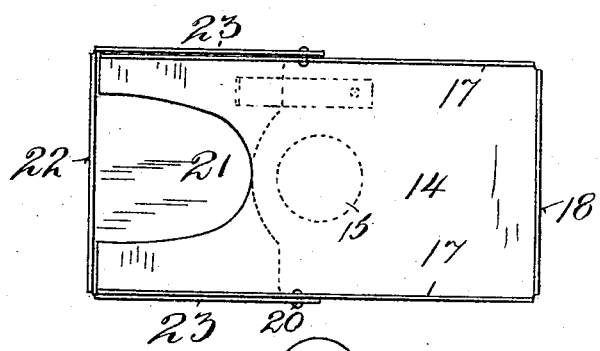
Figure 6:
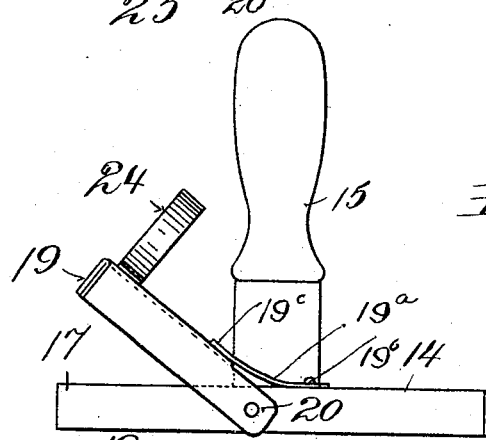
Figure 7:
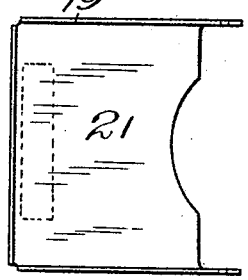
Figure 8:
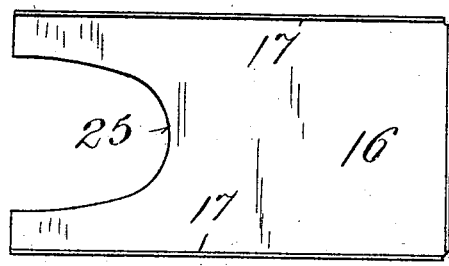

For a more particular description of my invention, reference is to be had to the accompanying drawings forming a part hereof, in which, Figure 1 is a side elevation of my improved mold; Fig. 2 a bottom view; Fig. 3 a plan of one part of the bottom of the mold; and Fig. 4 a like view of another part thereof. Fig. 5 is a bottom view of a modified form of mold; Fig. 6 a side elevation thereof; and Figs. 7 and 8, respectively, are plans of parts of the mold bottom.

Throughout the various views of the drawings, similar reference characters designate similar parts.

In the preferred embodiment of my invention, shown in Figs. 1 to 4 inclusive, the sandwich is formed in the pan 1 which consists of a fixed part 2 secured to a handle 3 and a pivoted part 4 pivoted to extensions 5 on the fixed part 2. The fixed part 2 is composed of a bottom 6 which is rectangular in form and provided with a side 7 and ends 8 which have the extensions 5 extending beyond and to which the part 4 is pivoted. The part 4 consists of a bottom 9 having a side 10 provided with a projection 11 at its lower edge and centrally located and ends 12 to which the extensions 5 are pivoted so that when the handle 3 is held and a finger pressed against the projection 11, the part 4 has its bottom 9 raised from the bottom 6 thereby raising any sandwich which may be in the pan 1. The bottom 9 has a recess 13 to aid in the removal of the sandwich.

In the construction shown in Figs. 5 to 8 inclusive, the pan 14 is fixed to the handle 15 and provided with a bottom 16 having sides 17 and an end 18. The other end 19 is pivotally connected with the sides 17 by pivots 20. The end 19 has a bottom 21, an end 22, sides 23 which project beyond the bottom to receive the pivots 20. On its lower exterior surface, the bottom 21 is provided with a ring or handle 24. The end 19 is pivoted outside the pan 14 and the bottom 16 is suitably recessed at 25 to permit the removal of a sandwich. A flat (or other form of) spring $19^a$ may be used to bring the pivoted part 19 back into position. In the form shown the spring is secured to the part 20 at $19^b$, its free end $19^c$ bearing on the part 19.

When the construction shown in Fig. 1 is used, the pan 1 is inverted so that the handle 3 points downwardly, a biscuit is then placed on the bottom 9, ice cream on this, a biscuit on this and then the projection 11 is pressed, thereby elevating the bottom 9 and permitting the removal of the sandwich.

When the structure shown in Fig. 5 is used, the operation is the same except that the handle 24 is lowered, thereby removing the end 19 from the sandwich and exposing it so that it can be removed from the pan 14, the recess 25 facilitating this removal.

While I have shown and described certain embodiments of my invention, it is obvious that it is not restricted thereto, but is broad enough to cover all structures that come within the scope of the annexed claims.

What I claim is:—

In a device of the class described, a pan having two parts, one of said parts having a bottom, a side and projecting ends, and the other part having a bottom with a recessed edge, ends, a side, and a projection on said side.

Signed at the city, county and State of New York, this 2nd day of May, 1908.

TOBIAS COHN.

Witnesses:
    GUS HANSON,
    B. V. MOHAN.